United States Patent
Hiruta et al.

(10) Patent No.: US 8,751,077 B2
(45) Date of Patent: Jun. 10, 2014

(54) ROUTE PLANNING DEVICE AND ROUTE PLANNING SYSTEM

(75) Inventors: Tomoaki Hiruta, Hitachi (JP); Mariko Okude, Hitachi (JP); Masatoshi Kumagai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 554 days.

(21) Appl. No.: 13/034,814

(22) Filed: Feb. 25, 2011

(65) Prior Publication Data
US 2011/0224900 A1 Sep. 15, 2011

(30) Foreign Application Priority Data
Mar. 9, 2010 (JP) ................................. 2010-052122

(51) Int. Cl.
*G06F 17/00* (2006.01)
*G06F 19/00* (2011.01)
*G06G 7/62* (2006.01)
*B60L 15/20* (2006.01)

(52) U.S. Cl.
USPC ............ 701/22; 701/29.1; 701/123; 701/410; 701/439; 701/457; 340/995.19; 340/995.24; 340/995.27

(58) Field of Classification Search
USPC ............ 701/22, 70, 93, 117, 123, 29.1, 29.3, 701/29.4, 31.4, 31.5, 32.3, 32.4, 32.5, 32.7, 701/32.9, 33.2, 34.2, 34.4, 400, 408, 409, 701/410, 411, 412, 418, 420, 421, 423, 425, 701/426, 431, 438, 439, 450, 451, 453, 454, 701/457, 461, 465, 467, 468, 482, 483, 484, 701/487, 516, 517, 522, 527, 532, 533, 537, 701/538, 300, 302; 180/65.1, 65.21, 180/65.265, 65.27, 65.275, 65.285, 65.29; 340/901, 988, 990, 995.1, 995.11, 340/995.12, 995.14, 995.15, 995.16, 340/995.17, 995.18, 995.19, 995.2, 995.21, 340/995.23, 995.24, 995.25, 995.27
See application file for complete search history.

(56) References Cited

U.S. PATENT DOCUMENTS

| | | | |
|---|---|---|---|
| 2009/0082957 A1* | 3/2009 | Agassi et al. | 701/208 |
| 2010/0106401 A1* | 4/2010 | Naito et al. | 701/201 |
| 2010/0204863 A1* | 8/2010 | Sakamoto et al. | 701/22 |
| 2011/0160992 A1* | 6/2011 | Crombez | 701/123 |

FOREIGN PATENT DOCUMENTS

| | | | |
|---|---|---|---|
| JP | 10-170293 A | | 6/1998 |
| JP | 2001-215124 A | | 8/2001 |
| JP | 2003-262525 A | | 9/2003 |
| JP | 2006-112932 A | | 4/2006 |
| JP | 2007-178216 A | | 7/2007 |
| JP | 2008-39547 A | | 2/2008 |

\* cited by examiner

*Primary Examiner* — Thomas Tarcza
*Assistant Examiner* — Edward Pipala
(74) *Attorney, Agent, or Firm* — Crowell & Moring LLP

(57) ABSTRACT

A route planning device includes: a search unit that searches for a plurality of facilities located near the minimum-cost route from a current position to the destination, where the battery can be charged; a guided route calculation unit that sets a waypoint on the minimum-cost route via which the moving object can be guided to each facility, and calculates a guided route from the waypoint to the each facility and a first power requirement indicating an amount of power required to travel through the guided route; and a facility designating unit that designates a target facility to which the moving object is to be guided, based upon third power requirements each calculated by adding a second power requirement, indicating an amount of power required to allow the moving object to travel from the current position to the waypoint, to the first power requirement and remaining power in the battery.

16 Claims, 16 Drawing Sheets

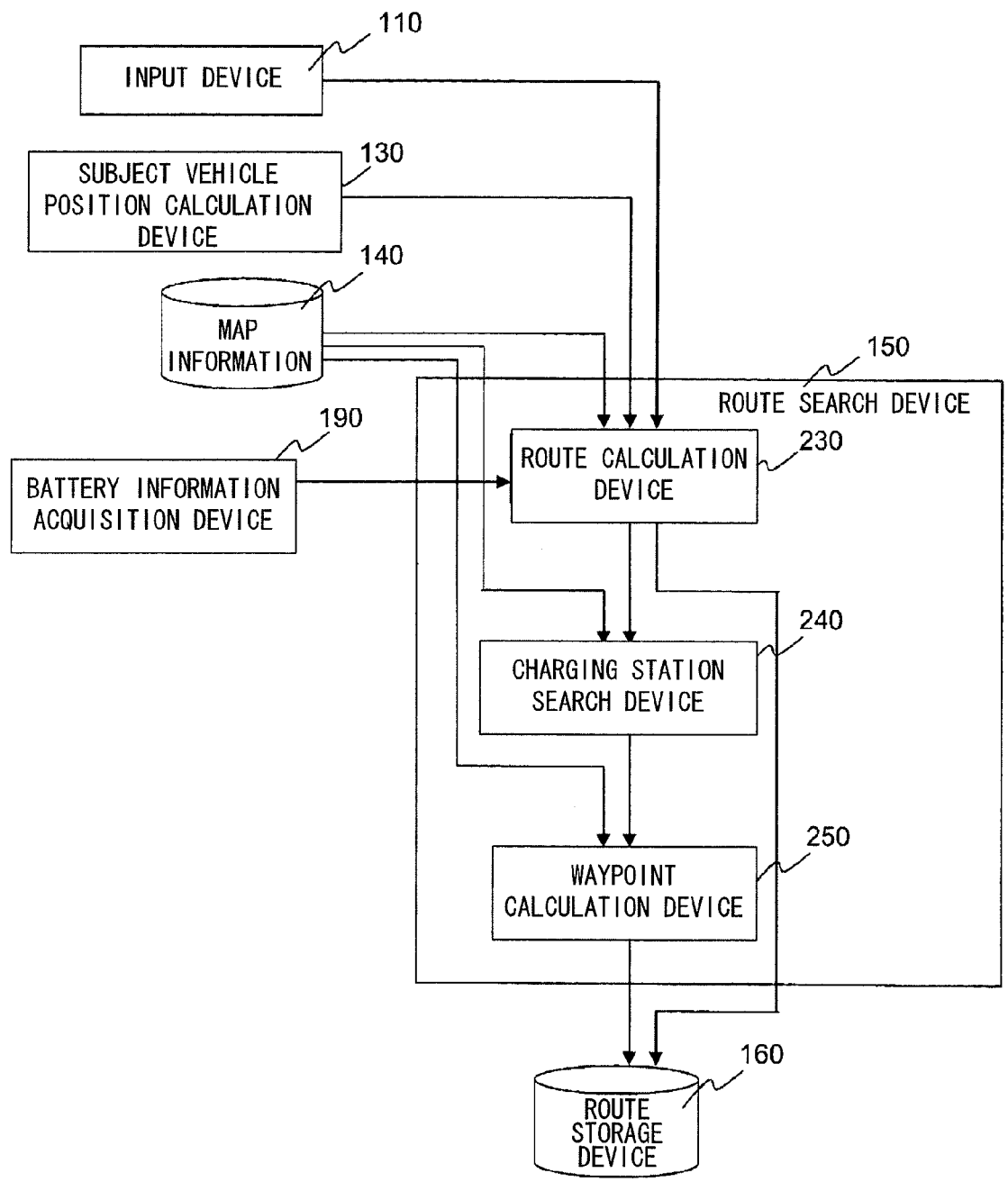

FIG.4A
ROAD DATA

| LINK ID | |
|---|---|
| MESH ID | |
| START-ING END | NODE ID |
| | LATITUDE |
| | LONGITUDE |
| | ALTITUDE |
| TERMI-NATING END | NODE ID |
| | LATITUDE |
| | LONGITUDE |
| | ALTITUDE |
| TRAFFIC CONTROL INFORMATION | |
| LINK ID | |
| ⋮ | |

FIG.4B
POI MANAGEMENT TABLE

| POI ID |
|---|
| CATEGORY |
| TITLE |
| MESH ID |
| LATITUDE |
| LONGITUDE |
| ADJACENT ROAD LINK ID |
| POI ID |
| |

FIG.4C MESH MANAGEMENT TABLE

| MESH ID | |
|---|---|
| LOWER LEFT COORDI-NATES | LATITUDE |
| | LONGITUDE |
| UPPER LEFT COORDI-NATES | LATITUDE |
| | LONGITUDE |
| LOWER RIGHT COORDI-NATES | LATITUDE |
| | LONGITUDE |
| UPPER RIGHT COORDI-NATES | LATITUDE |
| | LONGITUDE |
| MESH ID | |
| ⋮ | |

FIG.4D

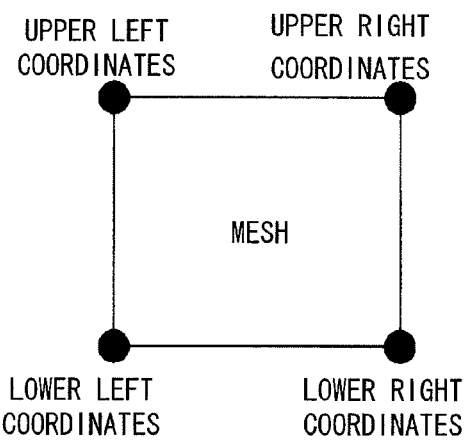

| ROUTE TO DESTINATION |||
|---|---|---|
| DISTANCE |||
| REQUIRED TRAVELING TIME |||
| POWER REQUIREMENT |||
| NUMBER OF ROAD LINKS: 4 |||
| ROAD LINK (1) | MESH ID ||
| | START POINT NODE ID ||
| | END POINT NODE ID ||
| | LINK ID: 01 ||
| | POWER REQUIREMENT ||
| ... |||
| ROAD LINK (4) | MESH ID ||
| | START POINT NODE ID ||
| | END POINT NODE ID ||
| | LINK ID ||
| | POWER REQUIREMENT ||

| GUIDED ROUTE 1 |  |
|---|---|
| CHARGING STATION POI ID |  |
| DISTANCE |  |
| REQUIRED TRAVELING TIME |  |
| POWER REQUIREMENT |  |
| WAYPOINT NODE ID |  |
| NUMBER OF ROAD LINKS: 2 |  |
| ROAD LINK (100) | MESH ID |
| | START POINT NODE ID |
| | END POINT NODE ID |
| | LINK ID: 01 |
| | POWER REQUIREMENT |
| ... | ... |
| ROAD LINK (200) | MESH ID |
| | START POINT NODE ID |
| | END POINT NODE ID |
| | LINK ID: 01 |
| | POWER REQUIREMENT |

FIG.10

|  | CURRENT POSITION - WAYPOINT POWER REQUIREMENT | WAYPOINT - CHARGING STATION POWER REQUIREMENT | CURRENT POSITION - CHARGING STATION POWER REQUIREMENT |
|---|---|---|---|
| WAYPOINT P1 | X1 | Y1 | Z1 ( X1 + Y1 ) |
| WAYPOINT P2 | X2 | Y2 | Z2 ( X2+ Y2 ) |
| WAYPOINT P3 | X3 | Y3 | Z3 ( X3 + Y3 ) |
| WAYPOINT P4 | X4 | Y4 | Z4 ( X4 + Y4 ) |

FIG.12

| | CHARGING STATION | CURRENT POSITION – CHARGING STATION POWER REQUIREMENT | REACHABILITY OK/NG | REMAINING BATTERY POWER ON ARRIVAL |
|---|---|---|---|---|
| WAYPOINT P1 | CHARGING STATION E1 | Z1 | 1 | B1 |
| WAYPOINT P2 | CHARGING STATION E2 | Z2 | 0 | – |
| WAYPOINT P3 | CHARGING STATION E3 | Z3 | 1 | B3 |
| WAYPOINT P4 | CHARGING STATION E4 | Z4 | 0 | – |

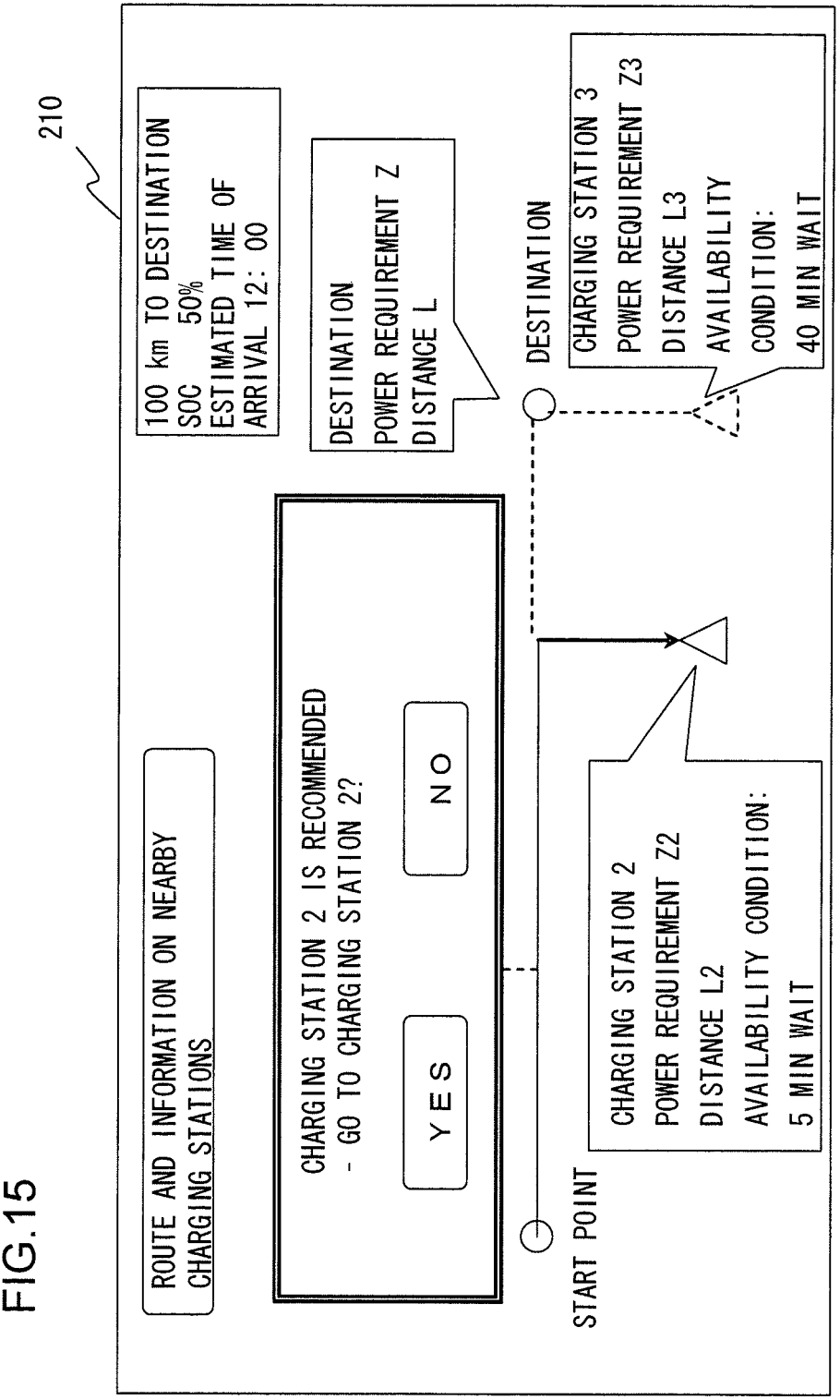

ROUTE PLANNING DEVICE AND ROUTE PLANNING SYSTEM

INCORPORATION BY REFERENCE

The disclosure of the following priority application is herein incorporated by reference: Japanese Patent Application No. 2010-052122 filed Mar. 9, 2010.

BACKGROUND OF THE INVENTION

1. Field of the Invention

The present invention relates to a route planning device and a route planning system with which an electric vehicle traveling on a route calculated to take the electric vehicle from a start point to a destination is monitored to ascertain whether or not the electric vehicle is able to travel to a nearby charging station.

2. Description of Related Art

The traveling range of an electric vehicle is normally shorter than that of an automobile equipped with an internal combustion engine. In addition, the electric vehicle needs to be charged at a special charging station. This means that the electric vehicle may need to make frequent stops at charging stations before it reaches the destination.

Onboard terminal apparatuses for electric vehicles in the known art include the onboard terminal apparatus disclosed in Japanese Laid Open Patent Publication No. 2003-262525. This onboard terminal apparatus automatically guides the subject electric vehicle to a nearby charging station when the remaining power in the battery of the electric vehicle becomes low.

SUMMARY OF THE INVENTION

However, the method described above, in which charging station information is collected as the remaining battery power in the electric vehicle becomes low, may give rise to an undesirable situation in which there is no charging station close enough for the vehicle to reach on its remaining power, and the electric vehicle will be stranded. Therefore, it is necessary to constantly monitor the vehicle to ascertain whether or not it will be able to reach a nearby charging station. However, the processing load on the onboard terminal that calculates the route from the subject vehicle position to a charging station and the corresponding power requirement every time the subject vehicle position changes is bound to be very large.

According to the 1st aspect of the present invention, a route planning device installed in a moving object equipped with a motor driven with a battery comprises: an input unit via which a user input is entered by a user; a minimum-cost route calculation unit that calculates, in response to a destination input indicating a destination entered by the user via the input unit, costs of a plurality of road links included in map information and calculates a minimum-cost route achieving a smallest sum of the costs, which extends from a current position of the moving object to the destination; a position calculation unit that determines the current position by using a sensor installed in the moving object; a search unit that searches through the map information for a plurality of facilities located near the minimum-cost route, where the battery can be charged or replaced; a guided route calculation unit that sets a waypoint on the minimum-cost route via which the moving object can be guided to each of the plurality of facilities, and calculates in advance a guided route from the waypoint to the each of the plurality of facilities and a first power requirement indicating an amount of power required to travel through the guided route; a facility designating unit that designates a facility among the plurality of facilities as a target facility to which the moving object is to be guided, based upon third power requirements each calculated by adding a second power requirement, indicating an amount of power required to allow the moving object to travel from the current position on the minimum-cost route to the waypoint, to the first power requirement having been calculated in advance and remaining power in the battery; and a display unit at which a position of the target facility and the guided route corresponding to the target facility are displayed.

According to the 2nd aspect of the present invention, in the route planning device according to the 1st aspect, it is preferred that the waypoint is a node included in the minimum-cost route; the plurality of facilities satisfy a predetermined search condition set by the search unit; and a cost of the guided route from the waypoint to the each of the plurality of facilities is smaller than a cost of a guided route from the waypoint to another facility satisfying the predetermined search condition.

According to the 3rd aspect of the present invention, in the route planning device according to the 2nd aspect, it is preferred that the predetermined search condition stipulates that the plurality of facilities each be located within a predetermined distance from the waypoint.

According to the 4th aspect of the present invention, in the route planning device according to the 2nd aspect, it is preferred that the predetermined search condition stipulates that the plurality of facilities each have a history of having been frequently patronized by the user.

According to the 5th aspect of the present invention, in the route planning device according to the 2nd aspect, it is preferred that the predetermined search condition stipulates that the plurality of facilities each be located within a reachable range from the waypoint, calculated for the moving object based upon the remaining battery power.

According to the 6th aspect of the present invention, in the route planning device according to the 2nd aspect, it is preferred that the predetermined search condition stipulates that a sum of the cost of the guided route from the waypoint to the each of the plurality of facilities and the cost of a route from the each of the plurality of facilities to the destination achieve a smallest value.

According to the 7th aspect of the present invention, in the route planning device according to the 1st aspect, it is preferred that the route planning device further comprises: a route guiding unit that guides the moving object to a specific facility, among facilities each designated as the target facility, based upon the guided route, once a number of the facilities each designated as the target facility among the plurality of facilities becomes smaller than a specific value.

According to the 8th aspect of the present invention, in the route planning device according to the 7th aspect, it is preferred that the route planning device further comprises: an acquisition unit that obtains information indicating availability conditions at the facilities each designated as the target facility. The route guiding unit determines the specific facility based upon the information indicating the availability conditions obtained via the acquisition unit.

According to the 9th aspect of the present invention, a route planning system comprises: a route plan transmission device; and a route plan reception device installed in a moving object equipped with a motor driven with a battery. The route plan transmission device comprises: a minimum-cost route calculation unit that calculates costs of a plurality of road links included in map information and calculates a minimum-cost route achieving a smallest sum of the costs, which extends from a current position of the moving object to a destination; a search unit that searches through the map information for a plurality of facilities located near the minimum-cost route, where the battery can be charged or replaced; a guided route calculation unit that sets a waypoint on the minimum-cost route via which the moving object can be guided to each of the plurality of facilities and calculates in advance a guided route from the waypoint to the each of the plurality of facilities and a first power requirement indicating an amount of power required to travel through the guided route; and a first communication unit that transmits to the route plan reception device first information indicating the waypoint calculated by the guided route calculation unit, the each of the plurality of facilities, the guided route and the first power requirement and receives second information from the route plan reception device. The route plan reception device comprises: an input unit via which a user input is entered by a user; a position calculation unit that determines the current position by using a sensor installed in the moving object; a second communication unit that receives the first information transmitted via the first transmission unit and transmits to the route plan transmission device the second information indicating the destination entered by the user via the input unit and the current position; a facility designating unit that designates a facility, among the plurality of facilities, as a target facility to which the moving object is to be guided, based upon third power requirements each calculated by adding a second power requirement, indicating an amount of power required to allow the moving object to travel from the current position on the minimum-cost route to the waypoint, to the first power requirement having been calculated in advance and remaining power in the battery; and a display unit at which a position of the each of the plurality of facilities and the guided route corresponding to the target facility are displayed.

According to the 10th aspect of the present invention, in the route planning system according to the 9th aspect, it is preferred that the waypoint is a node included in the minimum-cost route; the plurality of facilities satisfy a predetermined search condition set by the search unit; and a cost of the guided route from the waypoint to the each of the plurality of facilities is smaller than a cost of a guided route from the waypoint to another facility satisfying the predetermined search condition.

According to the 11th aspect of the present invention, in the route planning system according to the 10th aspect, it is preferred that the predetermined search condition stipulates that the plurality of facilities each be located within a predetermined distance from the waypoint.

According to the 12th aspect of the present invention, in the route planning system according to the 10th aspect, it is preferred that the predetermined search condition stipulates that the plurality of facilities each have a history of having been frequently patronized by the user.

According to the 13th aspect of the present invention, in the route planning system according to the 10th aspect, it is preferred that the second information further indicates the remaining power in the battery; and the predetermined search condition stipulates that the plurality of facilities each be located within a reachable range from the waypoint, calculated for the moving object based upon the remaining battery power.

According to the 14th aspect of the present invention, in the route planning system according to the 10th aspect, it is preferred that the predetermined search condition stipulates that a sum of the cost of the guided route from the waypoint to the each of the plurality of facilities and the cost of a route from the each of the plurality of facilities to the destination achieve a smallest value.

According to the 15th aspect of the present invention, in the route planning system according to the 9th aspect, it is preferred that the route plan reception device further comprises: a route guiding unit that guides the moving object to a specific facility among facilities each designated as the target facility based upon the guided route, once a number of the facilities each designated as the target facility among the plurality of facilities becomes smaller than a specific value.

According to the 16th aspect of the present invention, in the route planning system according to the 15th aspect, it is preferred that the route plan reception device further comprises: an acquisition unit that obtains information indicating availability conditions at the facilities each designated as the target facility; and the route guiding unit determines the specific facility based upon the information indicating the availability conditions obtained via the acquisition unit.

BRIEF DESCRIPTION OF THE DRAWINGS

FIG. 3 shows the structure of the route search device.

FIGS. 4A, 4B, 4C and 4D show the structure of map information.

FIG. 10 shows the structure of the waypoint management table in the monitoring device.

FIG. 12 shows the structure of the charging station reachability OK/NG table in the monitoring device.

FIG. 15 presents an example of a screen display with an inquiry prompting the driver to indicate whether or not to head for the recommended charging station.

DESCRIPTION OF PREFERRED EMBODIMENTS

Embodiments of onboard terminal apparatuses adopting the present invention are now described in reference to the drawings.

First Embodiment

Figure 1:
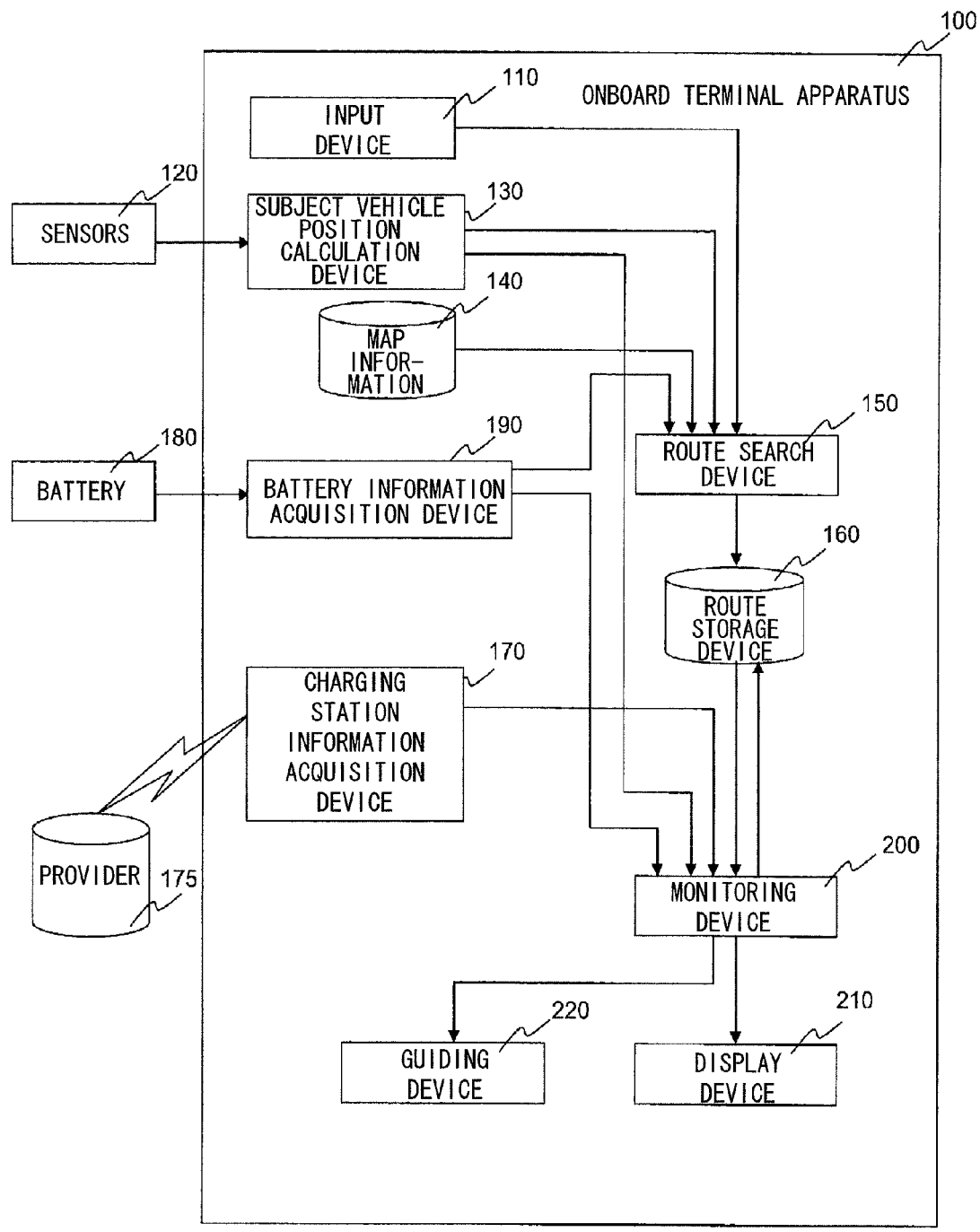
FIG. 1 shows the overall structure of the onboard terminal apparatus achieved in a first embodiment of the present invention.

FIG. 1 shows the overall structure of the route planning device according to the present invention, configured as an onboard terminal apparatus in the first embodiment. The onboard terminal apparatus 100 comprises an input device 110, a subject vehicle position calculation device 130, map information 140, a route search device 150, a route storage device 160, a charging station information acquisition device 170, a battery information acquisition device 190, a monitoring device 200, a display device 210 and a guiding device 220.

The onboard terminal apparatus 100, sensors 120 and a battery 180 are connected with one another via a cabin internal network such as a CAN. The onboard terminal apparatus 100, the sensors 120 and the battery 180 may be directly connected with one another or they may be connected via relay devices.

The input device 110 is a means by which the user is able to enter, through a user interface at the onboard terminal, instructions for setting a destination, selecting various options and the like. As a destination setting instruction is input, information pertaining to the destination is provided to the route search device 150. The user searches through destination POI information and sets a specific destination by using the street address of the destination, the destination category, the telephone number of the destination or the like as a key. "POI" stands for "point of interest" and the term "POI information" is used to refer to information, such as shop information, related to specific locations.

The sensors 120 include a GPS sensor, a vehicle speed pulse sensor and an angular speed sensor. Via these sensors, the position, the speed and the angular speed of the vehicle equipped with the onboard terminal apparatus 100 are measured. Information indicating the vehicle position, speed and angular speed is provided to the subject vehicle position calculation device 130.

Figure 2A:
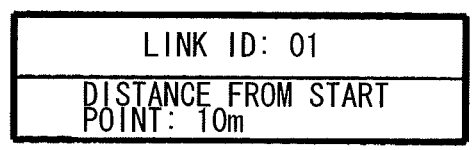
FIGS. 2A and 2B show the structure of subject vehicle position information.
Figure 2B:
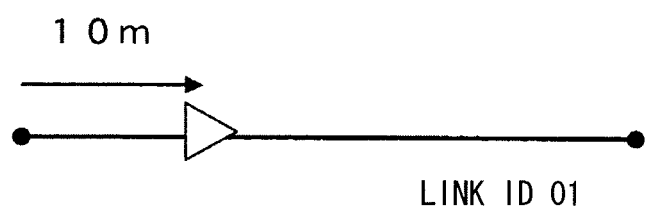

The subject vehicle position calculation device 130 calculates the subject vehicle position based upon the information provided from the sensors 120. The subject vehicle position is calculated by adopting a technology of the known art such as a Kalman filter technology or a dead-reckoning technology. Information indicating the subject vehicle position thus calculated is provided to the route search device 150 and the monitoring device 200. FIG. 2A shows the structure of the subject vehicle position information. The subject vehicle position information indicates the road link ID assigned to the road link in which the subject vehicle is currently located and the distance between the road link start point and the exact point at which the subject vehicle is currently present. In the example presented in the figure, the subject vehicle is located on a road link assigned with link ID "01" at a point 10 m away from the start point of the road link, as indicated in FIG. 2B.

The map information 140, which is stored in a storage device such as a hard disk or a flash memory, includes road information and POI information. In response to a request input by the route search device 150 indicating a specific map area, the road information and the POI information for the particular map area are provided to the route search device 150.

FIG. 3 shows the structure of the route search device 150. The route search device 150 includes a route calculation device 230, a charging station search device 240 and a waypoint calculation device 250. The destination information provided via the input device 110, the subject vehicle position information provided from the subject vehicle position acquisition device 130, the road information and the POI information extracted from the map information 140, and remaining battery power information provided from the battery information acquisition device 190 are input to the route search device 150. The route search device 150 determines through calculation a route from the current position to the destination and routes from a node present on the route to charging stations and outputs the calculation results to the route storage device 160. It also calculates a power requirement indicating the amount of power required to allow the vehicle to travel to the destination. The routes to the charging stations are calculated by designating a node on the route as the start point and a plurality of charging stations in the vicinity as destinations. In this document, a node point on the route is defined as a "waypoint" and an ith waypoint is notated as a waypoint Pi. The waypoint calculation device 250 designates a single charging station Ei in correspondence to the waypoint Pi. In addition, the route from the waypoint Pi to the charging station Ei is defined as a "guided route Li". Namely, the route from the current position to the charging station Ei is ascertained as a route passing through the waypoint Pi, which includes the guided route Li. The route from the current position to the waypoint Pi is part of the route from the current position to the destination.

The route search device 150 executes the route search processing in response to a destination input via the input device 110 or in response to the subject vehicle position calculated by the subject vehicle position calculation device 120 becomes set apart from the route to the destination stored in the route storage device 160 by a distance equal to a specific value.

The charging station information acquisition device 170 obtains, from an external provider 175, charging station position information and information indicating availability conditions at the charging stations. The charging station position information indicates the POI IDs assigned to the charging stations in the map information 140 and the latitudes/longitudes of the charging stations.

The battery 180, which is a secondary battery installed in the electric vehicle, may be a lead battery or a lithium ion battery. The battery 180 is used to drive a motor in the electric vehicle and the like.

The battery information acquisition device 190 measures the remaining battery power in the battery 180 by monitoring the condition of the battery 180. It provides information indicating the remaining battery power to the route search device 150 and the monitoring device 200.

The monitoring device 200 obtains the remaining battery power information from the battery information acquisition device 190 and power requirement information indicating the amounts of power required to allow the vehicle to travel to charging stations, from the route storage device 160, monitors the electric vehicle so as to ascertain whether or not it will be able to reach the charging stations and makes a decision as to whether or not the electric vehicle should be guided to a charging station, the information pertaining to which is stored in the route storage device 160. When the onboard terminal apparatus 100 is to guide the vehicle to the charging station Ei, information pertaining to the charging station Ei, the waypoint Pi and the guided route Li is provided to the display device 210 and the guiding device 220. The monitoring device 200 repeatedly executes the processing in the flowchart presented in FIG. 11, as described in detail later, over predetermined time intervals or predetermined traveling distance intervals by referencing the route calculation results output from the route search device 150 as described above and stored in the route storage device 160.

At the display device 210, which may be constituted with a liquid crystal display unit or the like, the route search results are read out by the monitoring device 200 from the route storage device 160, guided routes to charging stations in the vicinity and the corresponding power requirement information are displayed.

The guiding device 220 guides the vehicle to a specific charging station based upon the decision-making results obtained from the monitoring device 200. It guides the vehicle by displaying the guided route to the particular charging station on a map at the display device 210 and guiding the user to the charging station with voice instructions.

The structures of the map information 140, the route search device 150, the monitoring device 200 and the display device 210 are described next.

FIGS. 4A, 4B, 4C and 4D each present a diagram pertaining to a structural aspect of the map information 140. FIG. 4A shows the structure of road data contained in the map information 140. The road data are compiled in units of links each extending from one node to another node. Each set of road data includes a link ID with which the corresponding road can be identified, a mesh ID enabling identification of the mesh in which the particular road link is located, a node ID assigned to the node at the starting end of the road link and latitude information, longitude information and altitude information indicating the latitude, the longitude and the altitude of the starting end node, a node ID assigned to the node at the terminating end of the road link and latitude information, longitude information and altitude information indicating the latitude, longitude and the altitude of the terminating end node, and traffic control information. The traffic control information includes speed limit information, one-way traffic information and the like. It is to be noted that if an interpolation point is set on a link extending between two nodes, a sub link extending between a node and the interpolation point or between two interpolation points may be defined. In addition, the height of the road link may be indicated in gradient information instead of the altitude information indicating the altitudes at the starting end node and the terminating end node.

The term "meshes" is used to refer to grids into which the map is latitudinally and longitudinally divided. Mesh data in a secondary mesh are a block of data defined by 5 min of latitude and 7 min 30 sec of longitude with each side of the mesh representing a range of approximately 10 km. Tertiary meshes are blocks formed by dividing the secondary mesh into 10 equal parts both along the latitudinal direction and along the longitudinal direction. Each tertiary mesh is defined by 30 sec of latitude and 45 sec of longitude, with each side thereof representing a range of approximately 1 km. Meshes can each be identified by a mesh ID.

FIG. 4B shows the structure of the POI information included in the map information 140. Each set of POI information includes the POI ID assigned to the particular POI, the POI title, the category to which the POI belongs, the mesh ID assigned to the mesh where the POI is located, latitude information and longitude information, and road link ID of a road link adjacent to the POI. The POI title is the name inherent to the POI, under which the POI will be displayed at the display device 111. The category is a specific facility category to which the POI belongs. For instance, "1" may indicate a charging station, "2" may indicate a convenience store and "3" may indicate a gas station. The adjacent road link ID, with which the POI can be connected to a road link, is used for purposes of route search. When executing a route search, the adjacent road link ID is extracted from the POI information for the POI set as the destination and searching for a route to the extracted road link. The route search for a route to the POI designated as the destination is thus achieved.

FIG. 4C shows a mesh management table. In the mesh management table, the mesh ID assigned to each mesh and the coordinates of the four vertices of the mesh, i.e., the coordinates (latitudes and longitudes) of the lower left vertex, the upper left vertex, the lower right vertex and the upper right vertex, are stored (see FIG. 4D).

Figure 5:
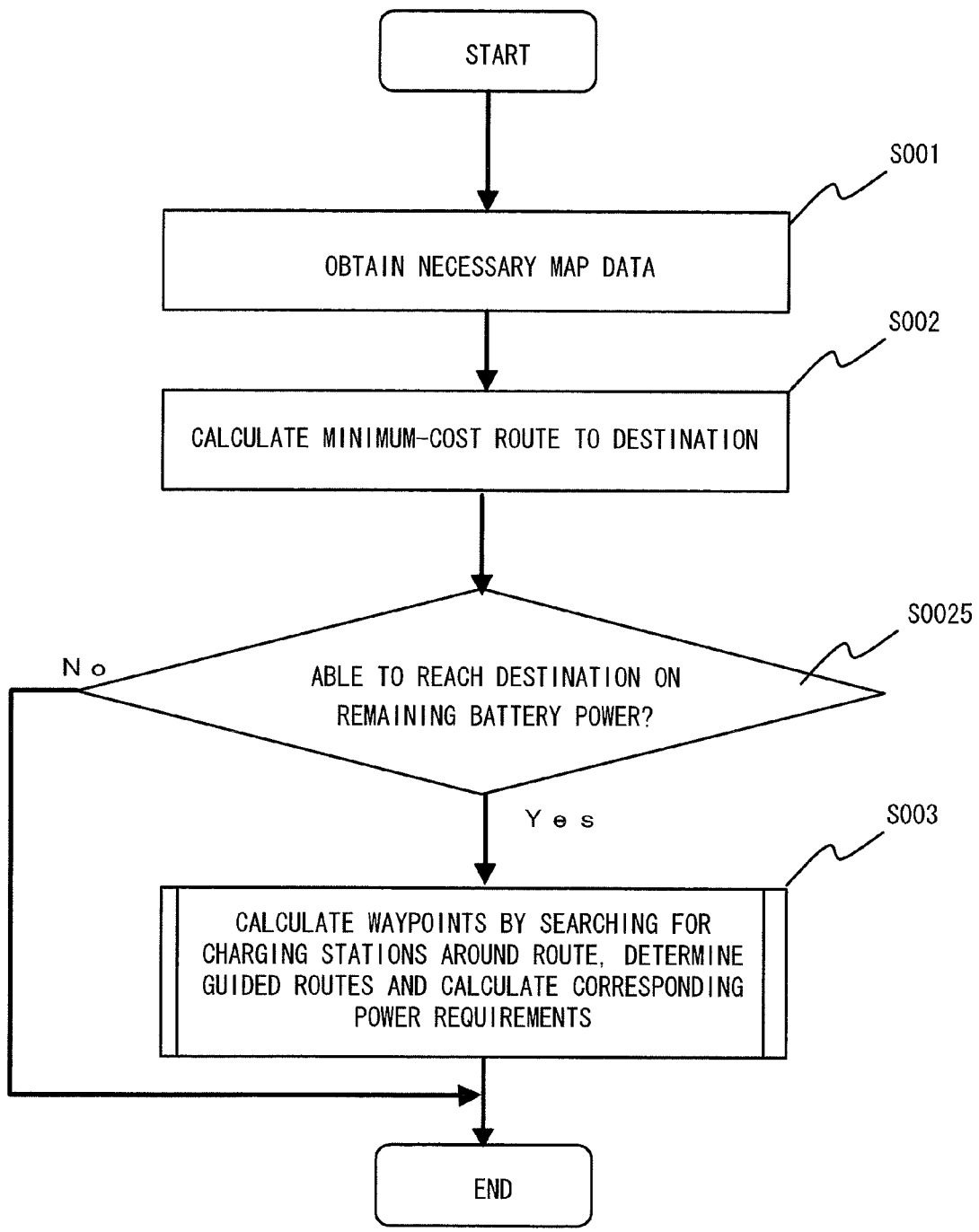
FIG. 5 presents a flowchart of the processing executed by the route search device.

In reference to FIG. 5, the flow of the processing executed by the route search device 150 is described. The internal processing by the route search device 150 shown in FIG. 3 is executed as shown in the flowchart in FIG. 5.

Figure 6:
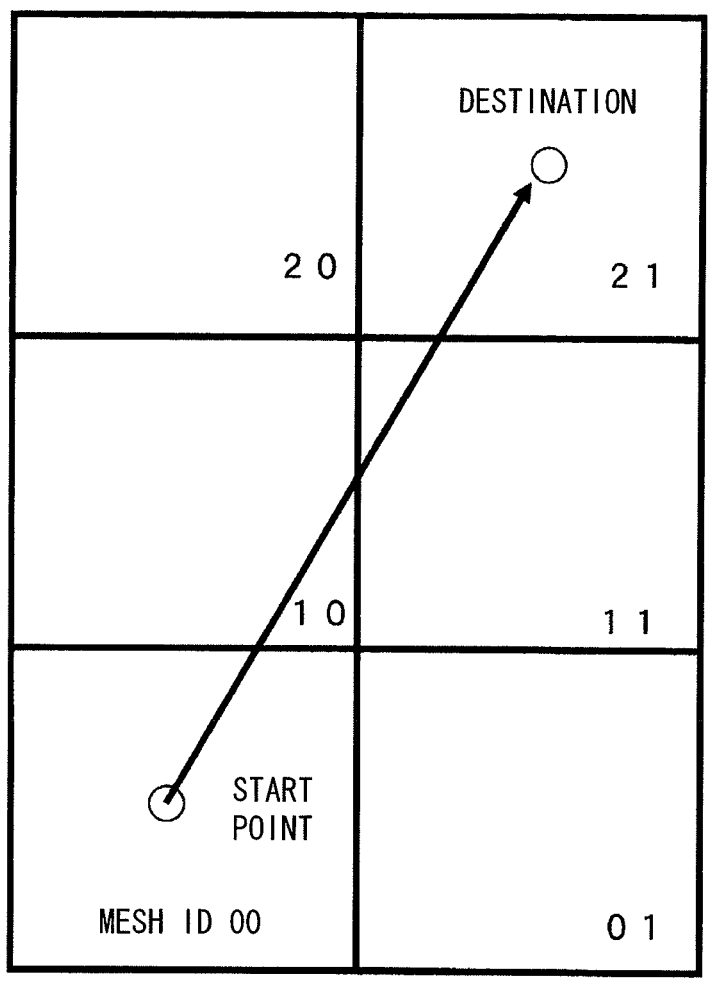
FIG. 6 illustrates the processing executed by the map data processing device.

First, the route search device 150 obtains the destination information from the input device 110, the subject vehicle position information from the subject vehicle position calculation device 130 and road information pertaining to a surrounding area included in the map information 140 (step S001). The processing in step S001 is executed by the route calculation device 230. Map areas that may be requested are all managed based upon a mesh ID list in the map information 140. A group of meshes that are requested include all the meshes present in a rectangular range, the diagonal of which connects the mesh where the destination is located and the mesh where the subject vehicle is currently located. FIG. 6 illustrates the processing executed in step S001. A rectangle made up with 2×3 meshes, with the diagonal thereof connecting a mesh assigned with mesh ID 00, in which the subject vehicle is currently located, and a mesh assigned with mesh ID 21, in which the destination is located, is formed. Then, the meshes assigned with mesh IDs 00, 01, 10, 11, 20 and 21 contained in the rectangle are designated as requested mesh IDs. Through this processing, the map data required for the route search are obtained.

Next, based upon the map information having been obtained and the remaining battery power information provided from the battery information acquisition device 190, a minimum-cost route, through which the vehicle will travel from the subject vehicle position ascertained via the subject vehicle position calculation device 130 to the destination set via the input device 110 with the minimum cost, is calculated (step S002). The processing in step S002 is executed by the route calculation device 230. The route having the least cost calculated by using the Dijkstra algorithm of the known art, is designated as the minimum-cost route. The cost may represent, for instance, the route distance (traveling distance), the required traveling time or the power requirement. The route data pertaining to the route thus calculated are stored into the route storage device 160. In step S0025, the power requirement indicating the amount of power required to allow the vehicle to travel through the route is calculated and a decision is made as to whether or not the vehicle will be able to reach the destination on the current remaining battery power. If it is decided that the vehicle will not be able to reach the destination, the flow of this processing ends and a route search is executed again through a technology of the known art to determine a route that includes a stopover at a nearby charging station.

The power requirement is also calculated by adopting a technology of the known art. It is assumed that the power requirement for a given road link is dependent upon the speed at which the road link is traveled and the gradient of the road link. The speed information and the road gradient information can be obtained from the map information 140. The power requirement W for the road link can be determined as expressed in (1) below based upon an average speed v with which vehicles travel through the road link and a gradient $\theta$ of the road link. The speed used in this calculation may be ascertained based upon real-time traffic information or statistical traffic information compiled by accumulating traffic information and statistically processing the accumulated traffic information.

$$W = k\_v \cdot v + k\_\theta \cdot \theta \qquad (1)$$

k_v and k_θ in the expression represent coefficients respectively used to convert the speed and the gradient to power requirements. The power requirement is ascertained as expressed in (1) for each of the link strings making up the route calculated in step S002 and the sum of the power requirements thus calculated is designated as an overall power requirement for the entire route.

Figures 7A, 7B:
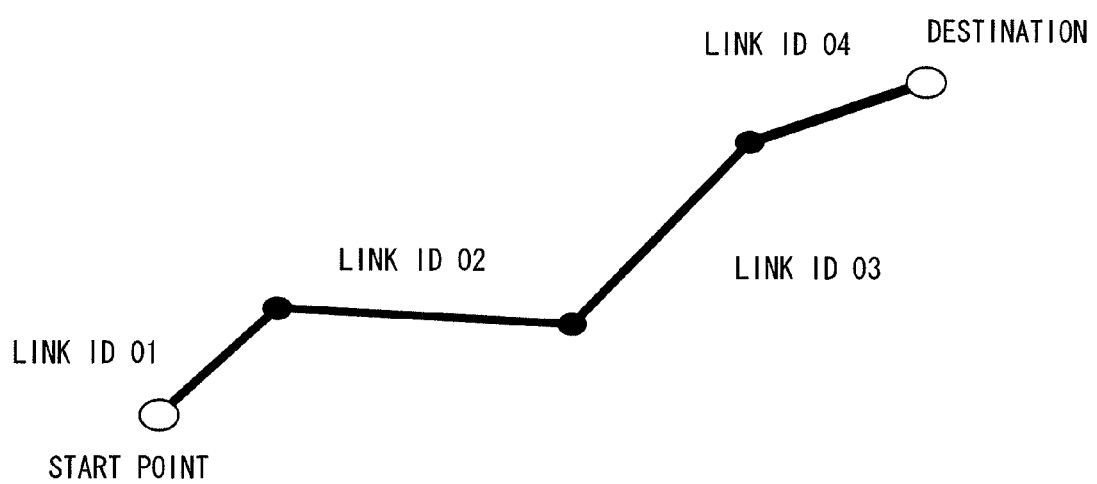
FIGS. 7A and 7B respectively show the structure of route data and an example of a route.

FIG. 7A shows the structure of route data and FIG. 7B presents an example of a route. The route data indicate the route type, the route distance, the required traveling time, the power requirement, the number of road links constituting the route, the road link IDs assigned to the individual road links, the mesh ID assigned to the mesh in which each road link is located, the start point node ID assigned to the start point node of the particular road link, the end point node ID assigned to the end point node of the road link and the power requirement indicating the amount of power required to travel through the road link.

If it is decided in step S0025 that the vehicle will be able to reach the destination, waypoints are calculated based upon the POI information pertaining to charging stations located near the calculated route, which is obtained from the map data, so as to determine guided routes and the power requirements for traveling through the guided routes (step S003). The processing in step S003 is executed by the charging station search device 240 and the waypoint calculation device 250. The processing in step S003 must be executed in advance so as to enable execution of the processing shown in FIG. 11, as described in detail later, in case the subject vehicle is judged to be no longer able to reach the destination due to sudden traffic congestion or the like occurring after it has been initially decided in step S0025 that the vehicle would be able to reach the destination on the remaining battery power. Upon completing the processing in step S003, the processing flow ends.

Figure 8:
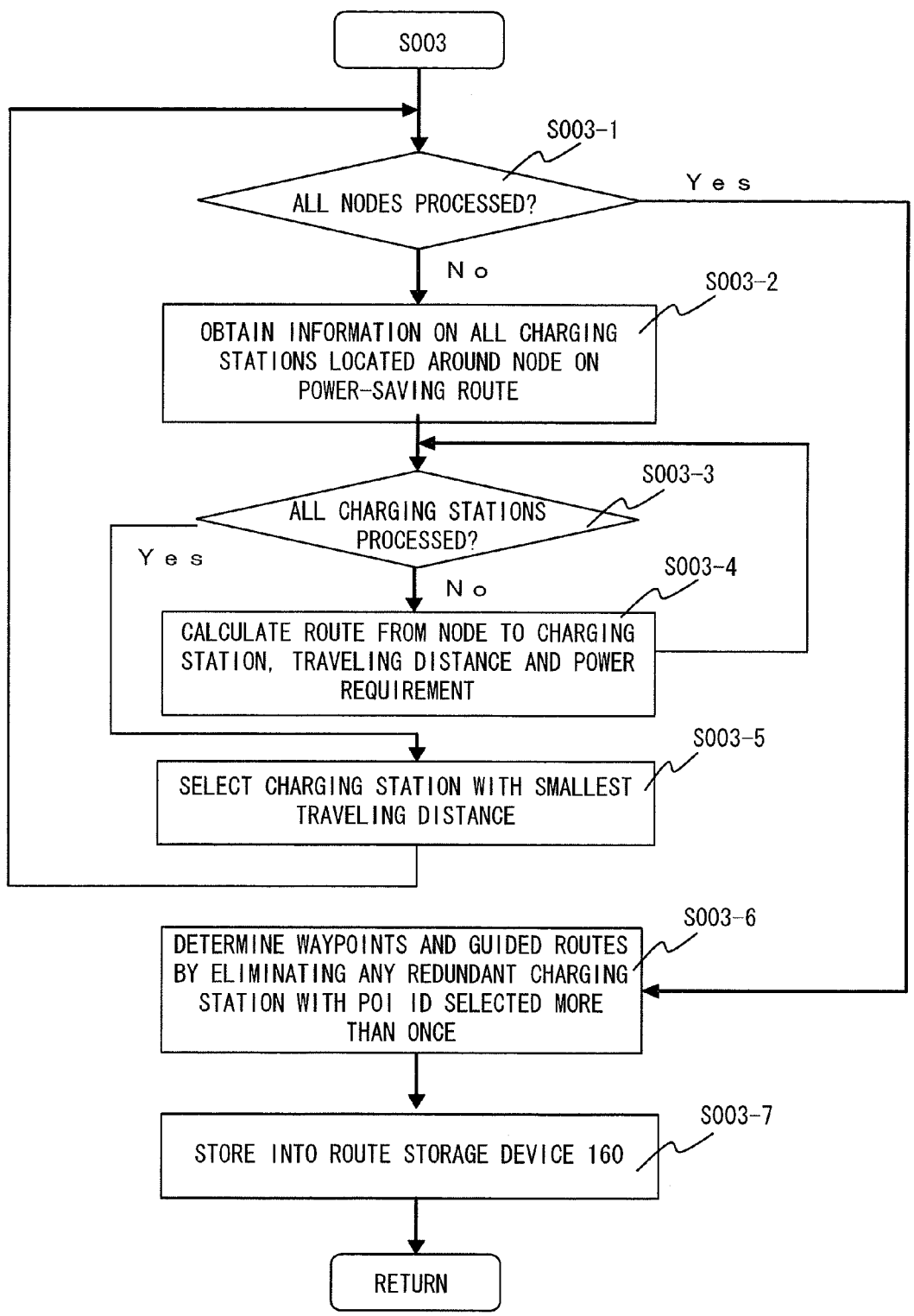
FIG. 8 presents a flowchart of the processing executed by the charging station search device and the waypoint calculation device.

In reference to the flowchart presented in FIG. 8, the processing executed in step S003 by the charging station search device 240 and the waypoint calculation device 250 is described in detail.

First, a decision is made as to whether or not the processing has been executed for all the nodes contained in the route by referencing the route storage device 160 (step S003-1). In this processing flow, all the nodes present in the route are sequentially processed, either starting from the start point toward the destination or from the destination toward the start point. If it is decided that all the nodes have not been processed yet (No in step S003-1), information pertaining to all the charging stations located within a circle centered on a node on the route and having a predetermined radius, is obtained (step S003-2). In addition to the information on the charging stations located within the specific radius, information on a charging station frequently patronized by the user may be obtained in step S003-2 based upon a record of charging stations having been used by the user in the past. Furthermore, the distance representing the radius of the circle may be determined in correspondence to the battery power available at the particular node on the route. For instance, if the available battery power at the node on the route is 50 percent of the maximum capacity, the distance representing the radius of the circle defining the search range and centered on the node on the route may be set to half the distance corresponding to the maximum battery power. The battery power available at the node on the route can be ascertained originating from the battery information acquisition device 190, which is obtained by the charging station search device 240 via the route calculation device 230, and also based upon a power requirement calculated to determine the amount of battery power required to allow the vehicle to travel from the start point to the node on the route. The processing in step S003-2 is executed by the waypoint calculation device 250.

Next, a decision is made as to whether or not all the charging stations have been processed (step S003-3). If it is decided that all the charging stations have not been processed yet (No in step S003-3), a route search is executed to calculate a route from the target node to any yet-to-be processed charging station within the circle set in correspondence to the target node, the traveling distance to the charging station and the corresponding power requirement (step S003-4). The route search is executed based upon the Dijkstra algorithm of the known art. If it is decided that all the charging stations have been processed (Yes in step S003-3), the charging station with the minimum cost, e.g., the charging station within the shortest traveling distance from the target node, among the charging stations having undergone the processing, is selected (step S003-5). Through this processing, a single charging station among the plurality of charging stations located in the vicinity of the node is extracted. The charging station located within the minimum traveling distance is ascertained by first executing a route search to determine the routes from the calculation target node to the individual charging stations. Next, the traveling distances and the power requirements are calculated for the individual routes. The power requirements can each be calculated as expressed in (1). Lastly, the charging station with the shortest traveling distance calculated for its route, among the plurality of charging stations, is extracted. As an alternative, the charging station with the smallest power requirement among the plurality of charging stations may be extracted as the minimum cost charging station. Through this processing, a single charging station is selected in correspondence to a given node. Once the charging station located within the minimum traveling distance is selected, the operation proceeds to step S003-1.

If it is decided that all the nodes have been processed (Yes in step S003-1), a waypoint and a guided route are determined for each of the plurality of charging stations having been extracted by handling any multiple charging stations sharing a single POI ID as one charging station (step S003-6). In other words, once any charging station extracted in duplicate is deleted, the node corresponding to each charging station is defined as a waypoint. In addition, the route to each charging station designated as a calculation-target charging station in step S003-4 is defined as a "guided route". Finally, guided route data calculated in correspondence to each waypoint are stored into the route storage device 160 (step S003-7). The guided route data calculated in correspondence to the individual waypoints will be described in detail later. Once step S003-7 is executed, the processing ends.

Figures 9A, 9B:
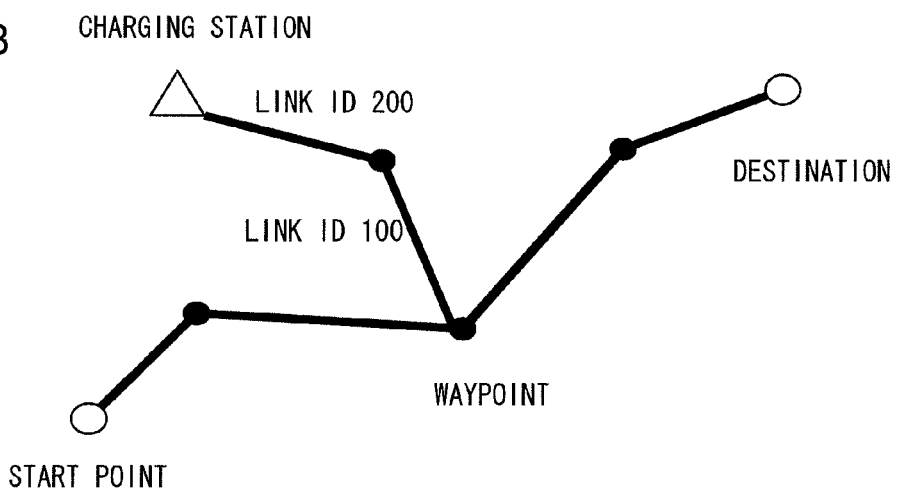
FIGS. 9A and 9B respectively show an example of the guided route data provided in correspondence to each waypoint and an example of a guided route.

FIG. 9A presents an example of the guided route data calculated in correspondence to each waypoint, whereas FIG. 9B presents an example of a guided route. Guided route data include the POI ID assigned to the charging station corresponding to the particular waypoint, the traveling distance over which the guided route extends, the required traveling time, the power requirement indicating the amount of power required to allow the vehicle to travel through the guided route, the node ID of the waypoint, the number of road links constituting the guided route, and the road link data pertaining to the road links constituting the guided route. Each set of road link data includes the mesh ID assigned to the mesh in which the corresponding road link is located, the node ID assigned to the start point node, the node ID assigned to the end point node, the link ID of the road link and the power requirement corresponding to the particular road link.

The processing described above is executed by the route search device 150 during a route search. The monitoring device 200 repeatedly executes the processing to be described later in reference to the flowchart presented in FIG. 11, over predetermined time intervals or each time the subject vehicle has traveled over a predetermined distance, by referencing the results of the processing executed by the route search device 150, which are stored in the route storage device 160.

The monitoring device 200 creates a waypoint management table based upon the information on the waypoints Pi and the charging stations Ei, obtained from the route search device 150, and makes a decision by referencing the table as to whether or not to guide the subject vehicle to a charging station. The waypoint management table is stored in an internal storage device within the monitoring device 200. FIG. 10 shows the structure of the waypoint management table. The waypoint management table, with the data therein managed in correspondence to each waypoint, is configured with three columns, i.e., a "current position-waypoint power requirement" column, a "waypoint-charging station power requirement" column and a "current position-charging station power requirement" column.

The values (Xi) entered in the "current position-waypoint power requirement" column are each determined when the subject vehicle position is updated by calculating the sum of power requirements corresponding to the road links that include the road link in which the subject vehicle is currently located in the road link in which the waypoint Pi is located and all the road links present between them on the route to the destination stored in the route storage device 160. In order to determine the entire power requirement for covering the distance between the road link where the subject vehicle is located and the road link where the waypoint Pi is located, the link ID of the road link where the subject vehicle is currently located and the distance between the start point of the road link and the current subject vehicle position are obtained first from the subject vehicle position calculation device 130. Next, the link ID matching the link ID of the road link where the subject vehicle is currently located, among the link IDs assigned to the road links constituting the route stored in the route storage device 160, is extracted. Then, the power requirements corresponding to the plurality of road links, which include the road link assigned with the extracted link ID and all the road links to be traveled through before reaching the node at the waypoint Pi, are all added together. The letter A represents the sum of the power requirements. However, the power requirement sum A is calculated by assuming that the subject vehicle is located at the start point of the road link. Accordingly, an excess power requirement A' is calculated. The excess power requirement A' is calculated as expressed in (1) based upon the link ID and the distance having already been obtained from the subject vehicle position calculation device 130. The ultimate power requirement (A-A') is then calculated and entered in the "current position-waypoint power requirement" column (Xi).

The value indicating the power requirement for covering the distance between each waypoint Pi and the corresponding charging station Ei, stored in the route storage device 160, is directly entered as Yi in the "waypoint-charging station power requirement" column. The values Zi entered in the "current position-charging station power requirement" column each represent the power requirement for the subject vehicle to travel from the current position to a specific charging station Ei via the corresponding waypoint Pi, and are each calculated as the sum of the corresponding value entered in the "current position-waypoint power requirement" column and the corresponding value entered in the "waypoint-charging station power requirement" column. The monitoring device 200 compares the values entered in the "current position-charging station power requirement" column with the remaining battery power obtained from the battery information acquisition device 190.

Figure 11:
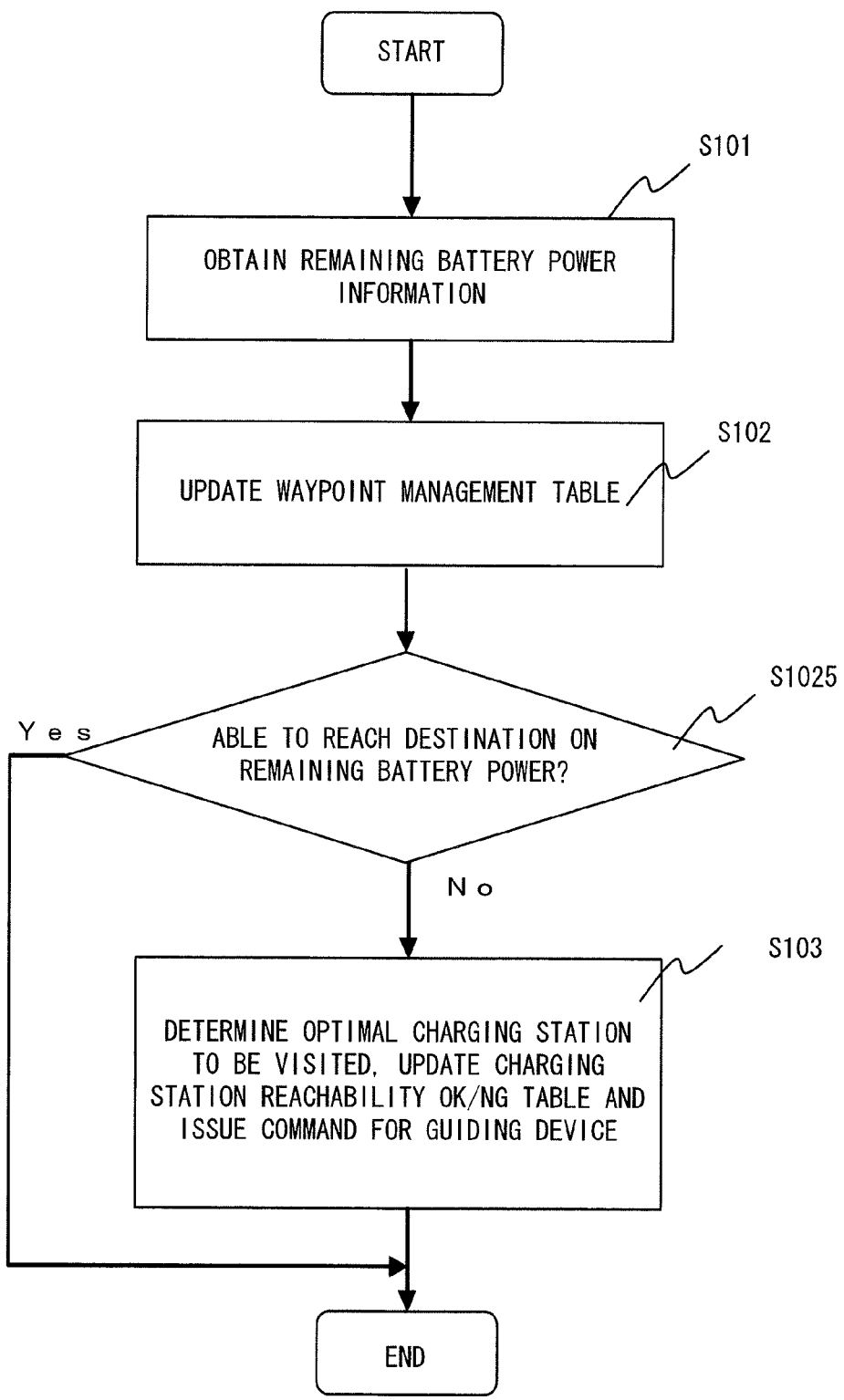
FIG. 11 presents a flowchart of the processing executed by the monitoring device.

The flow of the processing executed by the monitoring device 200 is described in reference to FIG. 11. The flowchart shows the internal processing executed in the monitoring device 200.

The remaining battery power available for the electric vehicle is first obtained from the battery information acquisition device 190 (step S101). The remaining battery power information thus obtained is compared with the power requirements that will allow the vehicle to travel to the charging stations, to be calculated in a step following step S101.

Next, the subject vehicle position information is obtained from the subject vehicle position calculation device 130, the waypoint information is obtained from the route storage device 160 and the information entered in the waypoint management table is updated (step S102). Since fixed values obtained from the route information storage device 160 are entered in the "waypoint-charging station power requirement" column, the values entered in the "current position-waypoint power requirement" column and the values entered in the "current position-charging station power requirement" column alone are updated in this step.

In step S1025, a decision is made as to whether or not the vehicle will be able to reach the destination with the remaining battery power currently available in the vehicle based upon the remaining battery power information having been obtained in step S101 and the information in the waypoint management table having been updated in step S102. If it is decided that the vehicle will not be able to reach the destination, a decision is made as to which charging station the vehicle should head for (step S103) based upon the values in the "current position-charging station power requirement" column in the waypoint management table having been updated in step S102 and the electric vehicle remaining battery power information having been obtained in step S101. If it is decided, on the other hand, that the vehicle will be able to reach the destination on the remaining battery power, the processing in step S103 is skipped.

In step S103, the power requirement (Zi) is compared with the remaining battery power in correspondence to each waypoint. It is to be noted that the remaining battery power is actually compared with a value Zi' obtained by multiplying the power requirement Zi by a safety factor k as expressed in (2) below, instead of comparing the remaining battery power with the power requirement Zi.

$$Zi'=k \cdot Zi \qquad (2)$$

The safety factor k in expression (2) should be set to a value greater than 1, so as to reduce the risk of failure to reach the charging station. The optimal charging station is selected by making a decision as to whether or not the vehicle will be able to reach the individual charging stations each corresponding to a specific waypoint. As long as Zi'≤A is true for the power requirement A calculated based upon the remaining battery power, the vehicle will be able to reach the corresponding charging station Ei, whereas if Zi'>A is true, the vehicle will not be able to reach the charging station Ei.

Information indicating whether or not the individual charging stations are within the range of the vehicle is managed in a charging station reachability OK/NG table. The structure of the charging station reachability OK/NG table is shown in FIG. 12. The charging station reachability OK/NG table includes a "current position-charging station power requirement" column, a "reachability OK/NG" column and a "remaining battery power upon arrival" column. A value "1" entered in the reachability OK/NG column indicates "OK", i.e., that the vehicle will be able to reach the corresponding charging station, whereas a value "0" indicates "NG", i.e., that the vehicle will not be able to reach the corresponding charging station.

The monitoring device 200 issues a command for the guiding device 220 (step S103) so as to guide the subject vehicle to the single charging station within the range of the vehicle once the number of charging stations that can be reached is reduced to 1, and then ends the processing flow. As an alternative, the monitoring device 200 may issue a command for the guiding device 220 so as to guide the subject vehicle to the charging station with the highest level of remaining battery power upon arrival once the number of charging stations that can be reached becomes equal to or smaller than a predetermined value. As a further alternative, the monitoring device 200 may issue a command for the guiding device 220 so as to guide the subject vehicle to the charging station with the highest level of remaining battery power on arrival when the number of charging stations with their remaining battery power on arrival values equal to or less than a predetermined value becomes equal to or smaller than a specific value. While the processing flow immediately ends if it is decided in step S1025 that the vehicle will be able to reach the destination in this embodiment, the command issued to the guiding device 220 may instead be canceled upon deciding that the subject vehicle will be able to reach the destination.

As described above, the monitoring device 200 reduces the risk of the subject vehicle failing to reach a charging station and ensures that the user will be able to travel on the recommended route with peace of mind by constantly monitoring the vehicle to ascertain whether or not the subject vehicle will be able to reach charging stations en route.

Figure 13A:
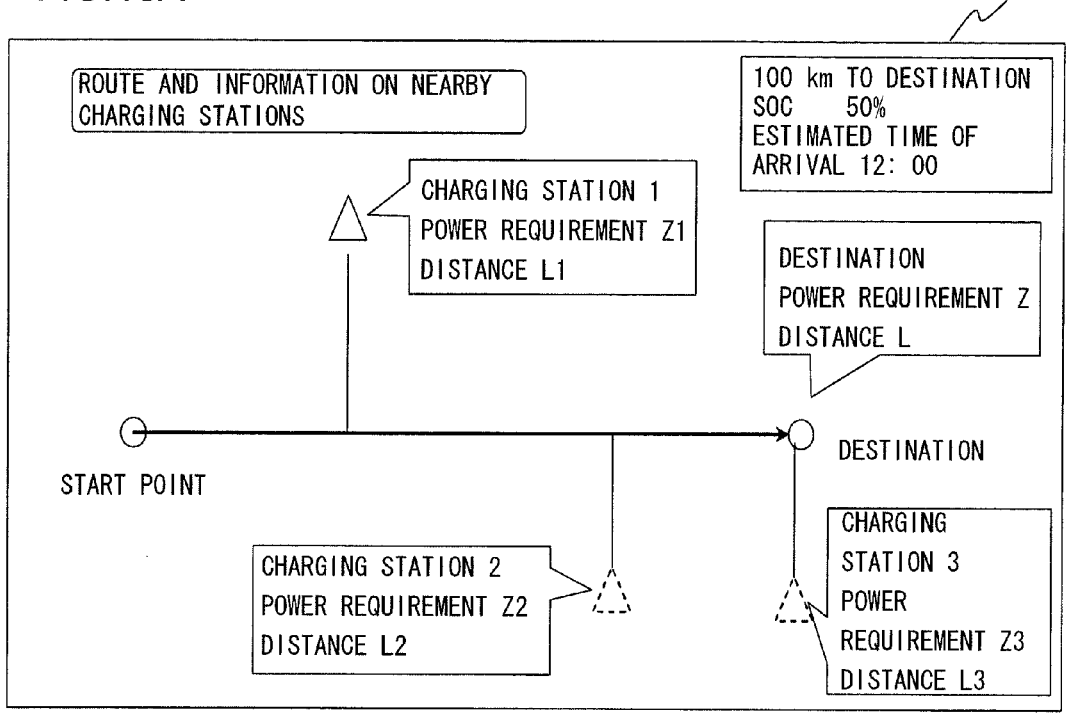
FIGS. 13A and 13B each present an example of a display that includes information indicating the power requirements for traveling to charging stations as well as the route displayed in a simple display mode.
Figure 13B:
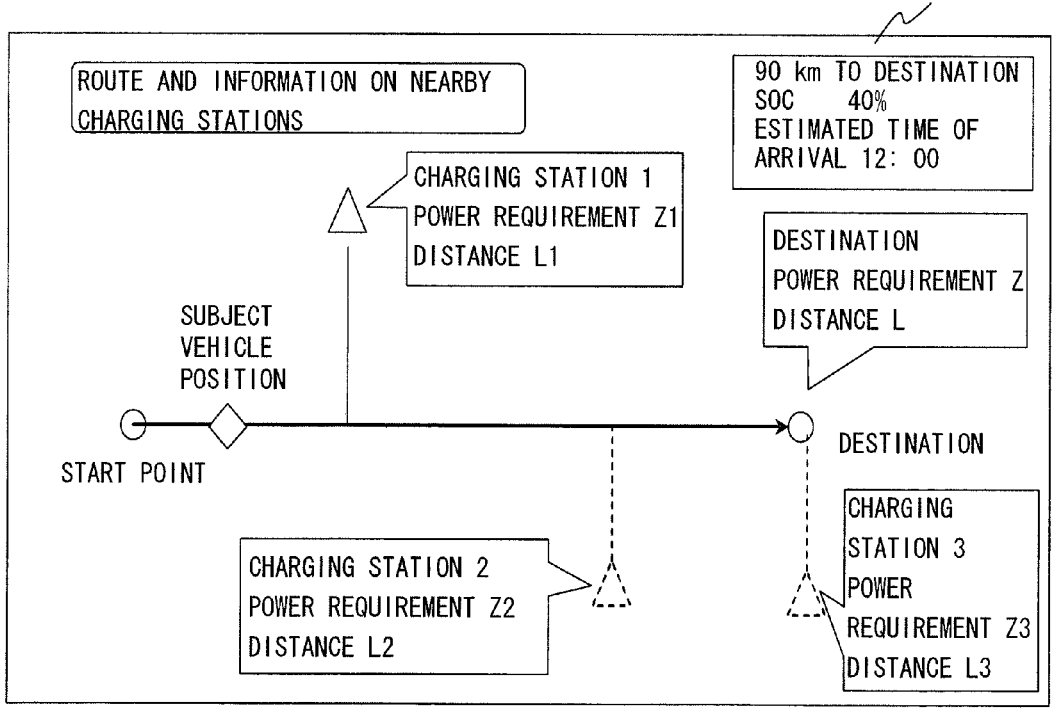

The display device 210 references the route storage device 160 and provides the user with information indicating the power requirements for reaching nearby charging stations together with the route brought up on display in a simple display mode. FIGS. 13A and 13B each present an example of such a screen display. FIG. 13A shows a display of the route to the destination provided in the simple display mode in combination with information indicating the distances to nearby charging stations present along the route and the corresponding power requirements, which may be brought up upon completing the route search for the optimal route to the destination. The power requirement values indicating the amounts of power required to allow the vehicle to travel the charging stations brought up on display match the values in the "current position-charging station power requirement" column in the charging station reachability OK/NG table shown in FIG. 12. FIG. 13B shows a display that may be brought up as the monitoring device 200 decides that the subject vehicle will not be able to reach charging stations 2 and 3 while the vehicle advances on the route toward the destination. In this screen, the information corresponding to the two charging stations 2 and 3 is displayed by using dotted lines, so as to distinguish it from the information pertaining to the charging station 1 located within the vehicle range. However, the present invention is not limited to this example and display of icons for charging stations that cannot be reached may be grayed out, while display of icons for charging stations that can be reached may flash or be displayed in a larger size, so as to highlight the information for charging stations within the vehicle range.

As an alternative to having the monitoring device 200 determine the charging station to which the subject vehicle is to be guided, the user may select, via an input unit such as a touch panel, the charging station to which he wishes to be guided based upon the lengths of the guided routes and the power requirements corresponding to the individual charging stations. Furthermore, instead of displaying the route to the destination in the simple display mode, the route may be displayed on the actual map.

Figure 14A:
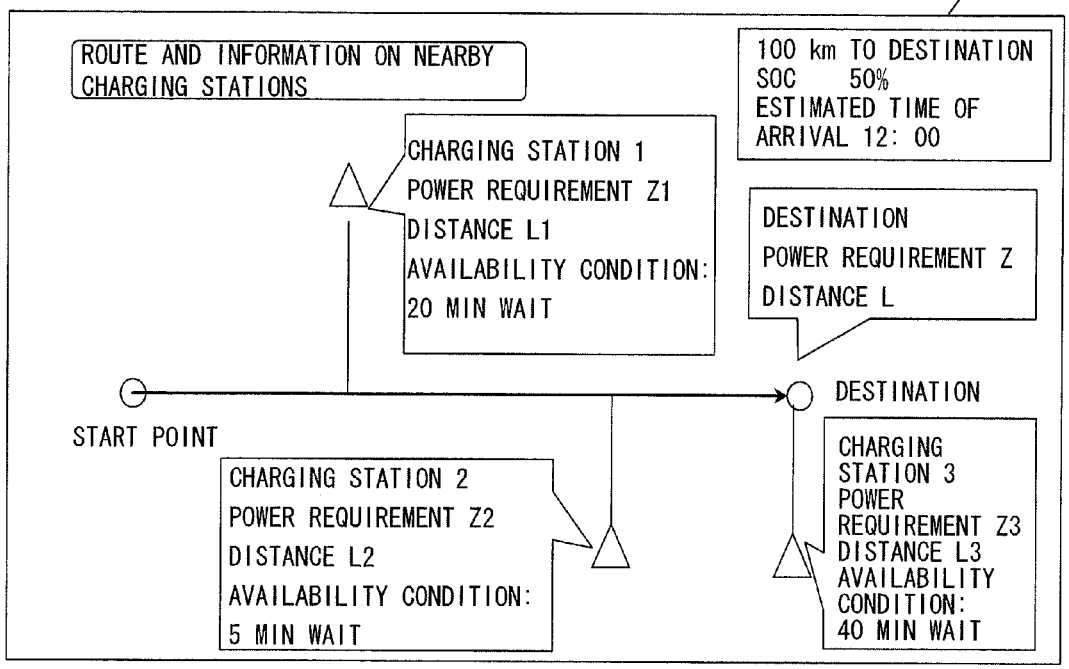
FIGS. 14A and 14B present examples of route display that include information indicating charging station accessibility conditions.
Figure 14B:
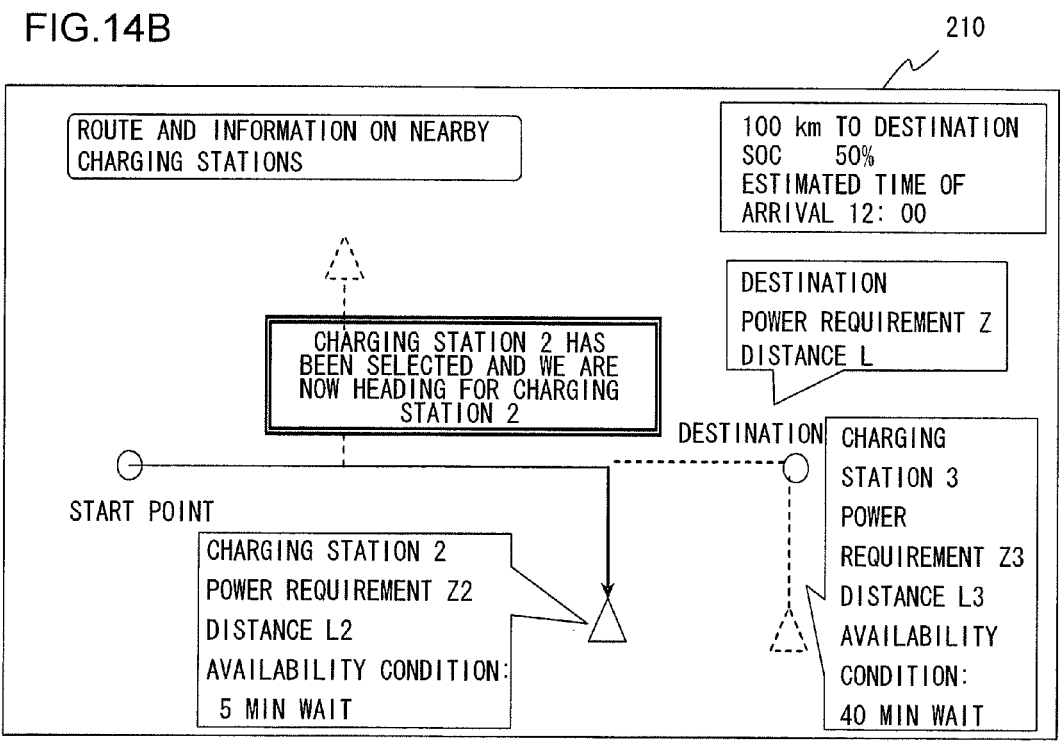

In addition, the display device 210 may display information indicating the availability conditions of the individual charging stations, obtained from an external source, as shown in FIGS. 14A and 14B. In this case, the user will select a charging station by referencing the information on display. FIG. 14A presents an example of a display of charging station availability conditions. The availability condition information is obtained from an external operation management center responsible for managing charging station availability conditions. FIG. 14B presents an example of a display that may be brought up to guide the subject vehicle to charging station 2 selected by the user via the input device 110 such as a touch panel.

Furthermore, if the reachability OK/NG information in the charging station reachability OK/NG table indicates that the subject vehicle will be able to reach a plurality of charging stations, the onboard terminal apparatus may suggest, via the display device 210, the charging station with the shortest wait time, based upon the charging station availability conditions, so as to allow the user to choose whether or not to head for the particular charging station. FIG. 15 presents an example of an inquiry screen display that may be brought up by the onboard terminal apparatus having determined that charging station 2 has the least wait time for the charging service and is, therefore, the recommended charging station. In the inquiry screen display, the user is provided with options of accepting or not accepting guidance to the recommended charging station. As an alternative, the charging station with the lowest charging service fee or a charging station indicated in the previous record to be a frequently patronized charging station may be selected as the recommended charging station.

The onboard terminal apparatus 100 achieved in the first embodiment determines in advance candidates for charging stations that the vehicle may visit, together with the guided routes to the charging stations. Thus, the vehicle, traveling on a route determined through a search, can be guided to a charging station with a minimum route calculation load on the onboard terminal and a minimum risk of battery depletion occurring before the vehicle reaches a charging station. In addition, the user will not experience any confusion since the display of the routes to the charging stations does not change even as the subject vehicle position changes.

Second Embodiment

Figure 16A:
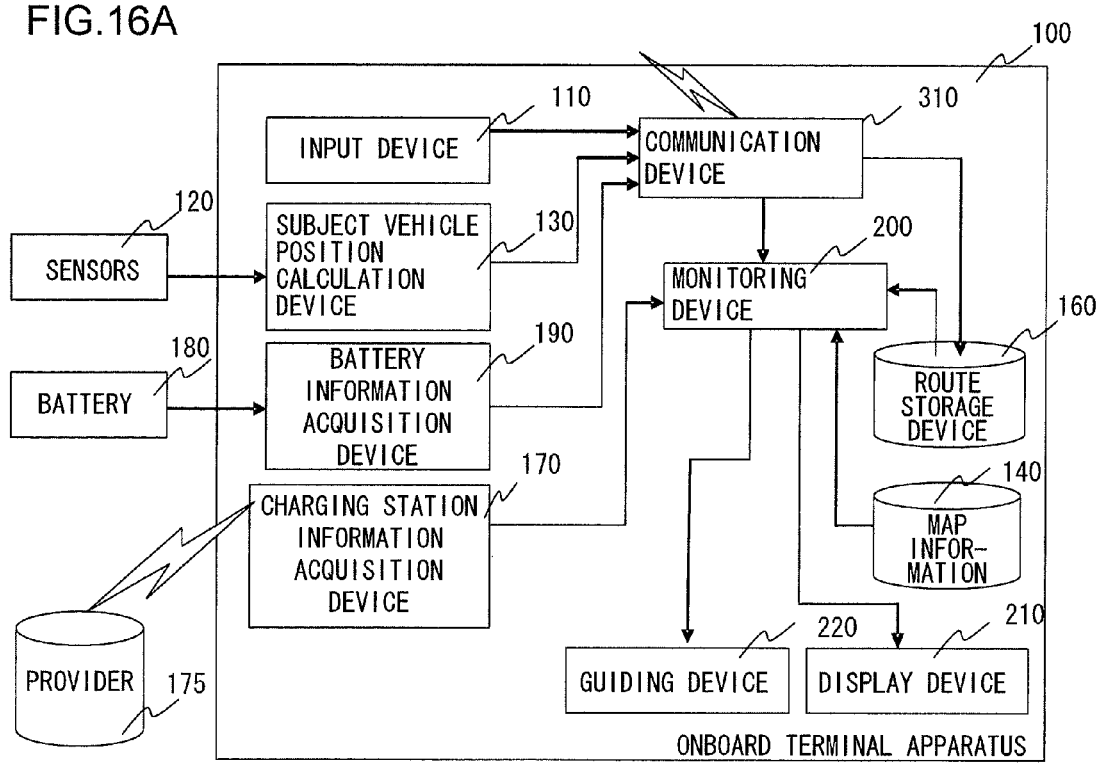
FIGS. 16A and 16B show the configuration of the route search system achieved in a second embodiment of the present invention.
Figure 16B:
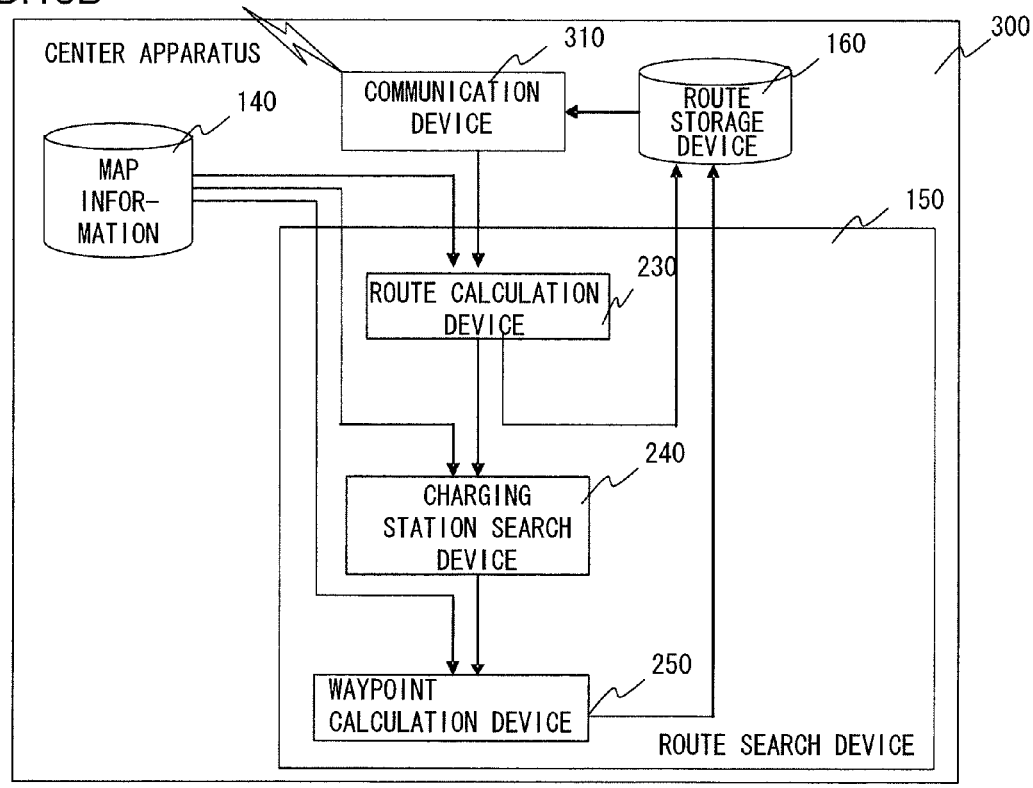

The route planning system according to the present invention is achieved as a route search system in the second embodiment. The route search system in the embodiment includes an onboard terminal apparatus 100 shown in FIG. 16A and a center apparatus 300 shown in FIG. 16B. The onboard terminal apparatus 100 comprises an input device 110, a subject vehicle position calculation device 130, map information 140, a route storage device 160, a charging station information acquisition device 170, a battery information acquisition device 190, a monitoring device 200, a display device 210, a guiding device 220 and a communication device 310.

The center apparatus 300 includes map information 140, a route search device 150, a route storage device 160 and a communication device 310.

The onboard terminal apparatus 100 and the center apparatus 300 are connected with each other through communication achieved via the communication devices 310. The communication devices 310 may each be constituted with, for instance, a portable telephone, a wireless LAN module, a PDA (personal digital assistant) unit or a modem constituting an integrated part of the onboard terminal apparatus 100. This configuration, in which the center apparatus 300 executes route search processing via its route search device 150, reduces the processing load on the onboard terminal 100 during the route search. Information indicating the route to the destination and the guided routes to charging stations, calculated at the center apparatus 300, is transmitted to the onboard terminal apparatus 100 via the communication device 310 at the center apparatus 300.

The onboard terminal apparatus 100, in turn, transmits via its communication device 310, the destination information entered via the input device 110, the position information provided from the subject vehicle position calculation device 130 and the remaining battery power information provided from the battery information acquisition device 190, to the center apparatus 300.

The information received by the communication device 310 at the center apparatus 300 is then input to the route search device 150.

Route search results output by the route search device 150 at the center apparatus 300 are transmitted via the communication device 310 to the onboard terminal apparatus 100. Information indicating the route search results, i.e., the route to the destination and the guided routes to the charging stations, is received by the communication device 310 of the onboard terminal apparatus 100. The route search results are provided to the user as they are brought up on display at the display device 210.

Since the monitoring device 200 and other devices assigned with the same reference numerals as those in FIG. 1 execute processing identical to that described in reference to the first embodiment, a repeated explanation is not provided.

Advantages similar to those of the onboard terminal apparatus 100 in the first embodiment are achieved with the route search system in the second embodiment.

Variations (1) While the route search device 150 in the center apparatus 300 transmits both the information on the route to the destination and the information on the guided routes to the charging stations to the onboard terminal apparatus 100 at once via the communication device 310 in the second embodiment described above, the information on the route to the destination and the information on the guided routes to the charging stations may be transmitted with separate timing. For instance, the route to the destination may be calculated first by the route search device 150 based upon the destination information and the subject vehicle position information provided by the onboard terminal apparatus 100, and the information on the route to the destination may then be transmitted via the communication device 310 to the onboard terminal apparatus 100. Next, the route search device 150 may search for nearby charging stations and information on waypoints, charging stations and guided routes output by the route search device 150 may be transmitted via the communication device 310 to the onboard terminal apparatus 100.

(2) Through the processing executed by the charging station search device 240 and the waypoint calculation device 250 in step S003-5 in FIG. 8 having been described in reference to the first embodiment, the route to a charging station, among a plurality of charging stations located near each node on the route, achieving the minimum route cost, is extracted. As an alternative, the optimal route may be extracted by also factoring in costs CB of the routes from the individual charging stations to the destination set via the input device 110 in addition to the costs CA of the route from the particular node on the route to the charging stations. In this case, the costs of the plurality of charging stations located around the node should be calculated as the sums of the costs CA and the costs CB and the charging station with the smallest sum should be extracted.

(3) While a description has been given in reference to the embodiments on an example in which the vehicle is monitored to determine whether or not it should be guided to a charging station and the vehicle is guided to a charging station through a guided route whenever necessary, the vehicle may be guided to another type of facility, such as a battery replacement station, instead of a charging station.

(4) While the present invention is adopted in the onboard terminal apparatus 100 in the embodiments described above, such an onboard terminal apparatus 100 may be, for instance, a PND (personal navigation device) that can be detachably installed in an electric vehicle.

The above described embodiments are examples and various modifications can be made without departing from the scope of the invention.

What is claimed is:

1. A route planning device installed in a moving object equipped with a motor driven with a battery, comprising:
    an input unit via which a user input is entered by a user;
    a minimum-cost route calculation unit that calculates, in response to a destination input indicating a destination entered by the user via the input unit, costs of a plurality of road links included in map information and calculates a minimum-cost route achieving a smallest sum of the costs, which extends from a current position of the moving object to the destination;
    a position calculation unit that determines the current position by using a sensor installed in the moving object;
    a search unit that searches through the map information for a plurality of facilities located near the minimum-cost route, where the battery can be charged or replaced;
    a guided route calculation unit that sets a waypoint on the minimum-cost route via which the moving object can be guided to each of the plurality of facilities, and calculates in advance a guided route from the waypoint to the each of the plurality of facilities and a first power requirement indicating an amount of power required to travel through the guided route;
    a facility designating unit that designates a facility among the plurality of facilities as a target facility to which the moving object is to be guided, based upon third power requirements each calculated by adding a second power requirement, indicating an amount of power required to allow the moving object to travel from the current position on the minimum-cost route to the waypoint, to the first power requirement having been calculated in advance and remaining power in the battery; and
    a display unit at which a position of the target facility and the guided route corresponding to the target facility are displayed.

2. A route planning device according to claim 1, wherein:
the waypoint is a node included in the minimum-cost route;
the plurality of facilities satisfy a predetermined search condition set by the search unit; and
a cost of the guided route from the waypoint to the each of the plurality of facilities is smaller than a cost of a guided route from the waypoint to another facility satisfying the predetermined search condition.

3. A route planning device according to claim 2, wherein:
the predetermined search condition stipulates that the plurality of facilities each be located within a predetermined distance from the waypoint.

4. A route planning device according to claim 2, wherein:
the predetermined search condition stipulates that the plurality of facilities each have a history of having been frequently patronized by the user.

5. A route planning device according to claim 2, wherein:
the predetermined search condition stipulates that the plurality of facilities each be located within a reachable range from the waypoint, calculated for the moving object based upon the remaining battery power.

6. A route planning device according to claim 2, wherein:
the predetermined search condition stipulates that a sum of the cost of the guided route from the waypoint to the each of the plurality of facilities and the cost of a route from the each of the plurality of facilities to the destination achieve a smallest value.

7. A route planning device according to claim 1, further comprising:
a route guiding unit that guides the moving object to a specific facility, among facilities each designated as the target facility, based upon the guided route, once a number of the facilities each designated as the target facility among the plurality of facilities becomes smaller than a specific value.

8. A route planning device according to claim 7, further comprising:
an acquisition unit that obtains information indicating availability conditions at the facilities each designated as the target facility, wherein:
the route guiding unit determines the specific facility based upon the information indicating the availability conditions obtained via the acquisition unit.

9. A route planning system, comprising:
a route plan transmission device; and
a route plan reception device installed in a moving object equipped with a motor driven with a battery, wherein:
the route plan transmission device comprises:
a minimum-cost route calculation unit that calculates costs of a plurality of road links included in map information and calculates a minimum-cost route achieving a smallest sum of the costs, which extends from a current position of the moving object to a destination;
a search unit that searches through the map information for a plurality of facilities located near the minimum-cost route, where the battery can be charged or replaced;
a guided route calculation unit that sets a waypoint on the minimum-cost route via which the moving object can be guided to each of the plurality of facilities and calculates in advance a guided route from the waypoint to the each of the plurality of facilities and a first power requirement indicating an amount of power required to travel through the guided route; and
a first communication unit that transmits to the route plan reception device first information indicating the waypoint calculated by the guided route calculation unit, the each of the plurality of facilities, the guided route and the first power requirement and receives second information from the route plan reception device; and
the route plan reception device comprises:
an input unit via which a user input is entered by a user;
a position calculation unit that determines the current position by using a sensor installed in the moving object;
a second communication unit that receives the first information transmitted via the first transmission unit and transmits to the route plan transmission device the second information indicating the destination entered by the user via the input unit and the current position;
a facility designating unit that designates a facility, among the plurality of facilities, as a target facility to which the moving object is to be guided, based upon third power requirements each calculated by adding a second power requirement, indicating an amount of power required to allow the moving object to travel from the current position on the minimum-cost route to the waypoint, to the first power requirement having been calculated in advance and remaining power in the battery; and
a display unit at which a position of the each of the plurality of facilities and the guided route corresponding to the target facility are displayed.

10. A route planning system according to claim 9, wherein:
the waypoint is a node included in the minimum-cost route;
the plurality of facilities satisfy a predetermined search condition set by the search unit; and
a cost of the guided route from the waypoint to the each of the plurality of facilities is smaller than a cost of a guided route from the waypoint to another facility satisfying the predetermined search condition.

11. A route planning system according to claim 10, wherein:
the predetermined search condition stipulates that the plurality of facilities each be located within a predetermined distance from the waypoint.

12. A route planning system according to claim 10, wherein:
the predetermined search condition stipulates that the plurality of facilities each have a history of having been frequently patronized by the user.

13. A route planning system according to claim 10, wherein:
the second information further indicates the remaining power in the battery; and
the predetermined search condition stipulates that the plurality of facilities each be located within a reachable range from the waypoint, calculated for the moving object based upon the remaining battery power.

14. A route planning system according to claim 10, wherein:
the predetermined search condition stipulates that a sum of the cost of the guided route from the waypoint to the each of the plurality of facilities and the cost of a route from the each of the plurality of facilities to the destination achieve a smallest value.

15. A route planning system according to claim 9, wherein:
the route plan reception device further comprises:
a route guiding unit that guides the moving object to a specific facility among facilities each designated as the target facility based upon the guided route, once a number of the facilities each designated as the target facility among the plurality of facilities becomes smaller than a specific value.

16. A route planning system according to claim 15, wherein:

the route plan reception device further comprises:
an acquisition unit that obtains information indicating availability conditions at the facilities each designated as the target facility; and
the route guiding unit determines the specific facility based upon the information indicating the availability conditions obtained via the acquisition unit.

* * * * *